United States Patent [19]

Ralph et al.

[11] Patent Number: 4,999,771
[45] Date of Patent: Mar. 12, 1991

[54] COMMUNICATIONS NETWORK

[75] Inventors: John T. Ralph, Mission Viejo, Calif.; Guy B. Beckley, Sequim, Wash.; Frank T. Brady, Pomona; Ivan Jelenek, Northridge; Darryl K. Korn, Laguna Beach; John Meyer, Irvine; Daniel L. Nay, Rancho Palos Verdes; Colin M. Searle, Buena Park; David Shick, Mission Viejo, all of Calif.; Richard W. Williams, Atlanta, Ga.; Jon C. Wilson, deceased, late of Los Angeles, Calif., by Eva Wilson, executrix

[73] Assignee: Control Data Corporation, Minneapolis, Minn.

[21] Appl. No.: 91,175

[22] Filed: Aug. 31, 1987

[51] Int. Cl.⁵ .............................................. G06F 13/00
[52] U.S. Cl. .................................. 364/200; 364/284.3; 364/228.5; 364/240.8; 364/239.3
[58] Field of Search ... 364/200 MS File, 900 MS File, 364/200, 900

[56] References Cited

U.S. PATENT DOCUMENTS

| | | | |
|---|---|---|---|
| 4,181,936 | 1/1980 | Kober | 364/200 |
| 4,207,609 | 6/1980 | Luiz et al. | 364/200 |
| 4,228,496 | 10/1980 | Katzman et al. | 364/200 |
| 4,292,669 | 9/1981 | Wollum et al. | 364/200 |
| 4,363,094 | 12/1982 | Kaul et al. | 364/200 |
| 4,418,382 | 11/1983 | Larson et al. | 364/200 |
| 4,428,043 | 1/1984 | Catiller et al. | 364/200 |
| 4,466,060 | 8/1984 | Riddle | 364/200 |
| 4,701,845 | 10/1987 | Andreasen et al. | 364/200 |
| 4,766,534 | 8/1988 | DeBenedictis | 364/200 |
| 4,821,170 | 4/1989 | Bernick et al. | 364/200 |
| 4,858,112 | 8/1989 | Puerzer et al. | 364/200 |

Primary Examiner—Gareth D. Shaw
Assistant Examiner—Paul Kulik
Attorney, Agent, or Firm—Robert M. Angus; Frederick W. Niebuhr

[57] ABSTRACT

Data messages are transmitted between host data processors and a communications processor. Data messages from a communications processor are transformed for the host processor to which the message is assigned. Data messages from a host processor are transformed for the communications processor. Protocol is established between (a) untransformed data messages from the communications processor and transformed data messages for the communications processor, and (b) untransformed data messages from each host processor and transformed data messages for each host processor. A device interface connects a plurality of host processors to a plurality of buses, each bus being connected to one communications processor. The device interface handles the protocol, transformation and control function in parallel so that messages between a given host processor and terminal connected to a communications processor are processed through a device interface. The result is that user terminals and host applications are managed as "pools" of logical devices with dynamic session assignment.

6 Claims, 4 Drawing Sheets

COMMUNICATIONS NETWORK

This invention relates to data communication apparatus and methods, and particularly to data communications for distributed parallel processing. The present invention is particularly useful in connection with data communications between a host computer mainframe and a plurality of user terminals, and the like. Although the present invention will be described in connection with a class of mainframes known as Systems Network Architecture (SNA) mainframes from International Business Machines Corporation (IBM), it will be evident that the present invention is useful in connection with mainframes of other types and manufacturers. Common to such computer mainframes is the fact that they include the capability of a vast communications function employing virtual communications access methods to implement protocol within the host computer. Typically, such computer mainframes serve as hosts to a plurality of user terminals, and data communications are employed to establish communications between the terminals and the host computer mainframes.

In a typical SNA environment, user terminals are assigned to a predetermined host computer with application programs residing in that host logically "owned" by the host's Virtual Telecommunications Access Method apparatus (VTAM). Each host VTAM maintains session ownership in its terminal-to-application and application-to-application connections. When access to another host's assigned resources is required, additional controls within the network assume secondary "ownership" of the session. As a result, the host VTAM components become overburdened with excessive session management, thereby affecting throughput, response time, and session handling capabilities.

The present invention contemplates a data communication network wherein user terminals and host applications are managed as "pools" of logical devices. Session "ownership" is replaced with dynamic session assignments, with proliferation of session ownership being avoided when multiple resource access requests originate with a single application or terminal device. All data communication network element initialization, control, problems, and corrective actions are transparent to the host. As a result, the data communication network appears to the host as a major peripheral, not as an essential element to the operation of the host. Hence, there are no unnecessary session management activities, the response time of the network is optimized, and session handling capability is maximized.

In prior data communication networks employing a plurality of host processors, it was common to employ a single microprocessor for handling the routing and protocol for up to four host mainframes. However, the employment of a single microprocessor necessitated serial processing of the communications and protocol, resulting in slower message processing. Further, such systems were incapable of rerouting requests in the event of a malfunction of part of the system.

In accordance with the present invention, device interface is employed to network a plurality of host processors to a bus, with a plurality of other device interfaces communicating to yet other pluralities of host mainframes. Each device interface includes processor means dedicated to a specific function, such as protocol, translation, or control. As a result, the various protocol, translation, and control functions are performed in parallel rather than serially, thereby increasing the efficiency of message transmission. A distributed network system employing a communicating processor is provided between the device interface and host mainframes, on one end, and the plurality of terminals on the other, the arrangement being such that the distributed network system routes messages between the device interface and the user terminals. As a result, message communication is efficiently routed and managed between terminals and the proper host mainframe. In the event of malfunction of a part of the system, the distributed network system communications processor can reroute messages to bypass the afflicted equipment.

The data communications apparatus transfers bit-coded messages between a plurality of host processors and a plurality of user terminals. A device interface is connected to one or more individual host processors. A communications processor is connected to each of the terminals. Bus means connects the device interface to the communications processors; the device interface including a plurality of processor means to establish protocol among messages between the communications processor and the device interface and to establish protocol among messages between the respective host processor and the interface, and to transform messages for communication between the host processor and the communications processor.

In accordance with the present invention, data messages are transmitted between a plurality of host data processors containing application programs and the communications processor connected to a plurality of user terminals by transforming data messages from the network processor for use with the host data processor to which the message is assigned and transforming messages from each of the data processors for use with the network processor. Protocol is established of untransformed data messages from the network processor and transformed data messages from the communications processor while simultaneously protocol is established of untransformed data messages from each of the host processors and transformed data messages for each of said respective host processors.

One feature of the present invention resides in the fact that the communications processor includes a control for determining a malfunction of any of the host processors for transforming or protocol functions to establish a route for data messages to avoid that malfunction.

Another feature of the present invention resides in the fact that each device interface contains information identifying the application program to be executed by the respective host processor so that each data message from the communications processor is assigned to an individual host processor.

Another feature of the present invention resides in the fact that in the event of malfunction of a host mainframe, application activities of that mainframe may be transferred to another mainframe with messages rerouted to it.

The above and other features of this invention will be more fully understood from the following detailed description, and the accompanying drawings, in which:

DETAILED DESCRIPTION OF PREFERRED EMBODIMENTS

Figure 1:
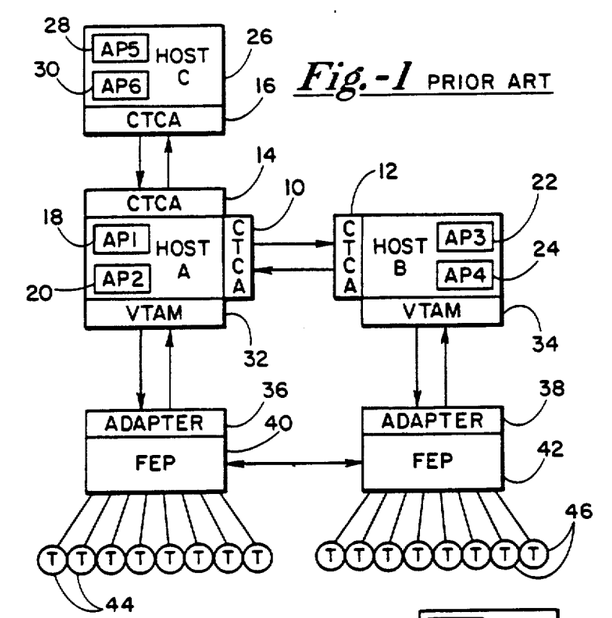
FIG. 1 is a block diagram of a communication network in accordance with prior techniques.

Referring to the drawings, and particularly to FIG. 1, there is illustrated a typical data communication network employing IBM host computers In a typical configuration, the computers contain System Network Architecture (SNA) compatible with the rest of the network. The system includes a plurality of host computers, designated in the drawing as Host A and Host B, connected together by computer-to-computer adapter (CTCA) 10 and 12. Host computer A contains application software 18 and application software 20 whereas host computer B contains application software 22 and 24, respectively. Additional host computer C containing application software 28 and 30 may be connected to host computer A through CTCAs 14 and 16. Host computers A and B are connected through virtual telecommunications access method (VTAM) apparatus 32 and 34 to adaptors 36 and 38 of front-end processors (FEP) 40 and 42 which provide network capabilities to the various terminals 44 and 46, terminals 44 being connected to front-end processor 40 and terminals 46 being connected to front-end processor 42.

It should be understood herein that the terminals may be any suitable data processing terminals for input to and/or output from a host computer.

Host computers A and B are "local hosts" in the sense that they are directly connected through VTAMs 32 and 34 to the network apparatus. Host computer C is an "upline" host because it is not directly attached to the network, but instead uses the communications services of host computer A to communicate with terminals. It is also possible that additional terminals may be directly connected to the host computers, but these do not form part of the network system and need not be discussed herein.

In the data communications network illustrated in FIG. 1, the host VTAM 32 or 34 maintains session ownership in the terminal-to-application connections. Thus, a terminal 44 communicating with an application 18 or 20 in host A is controlled by VTAM 32, whereas a terminal 46 communicating with host B is controlled by VTAM 34. However, if a terminal 46 connected to front-end processor 42 requires access to an application program in host A, data communications must be established between the two front-end processors 40 and 42 to establish communications between the terminal 46 and the program in host A. When this occurs, the front-end processors establish a second control point for "ownership" of the session between the terminal 46 and host A thereby adding burden to the management of the communication system.

Figure 2:
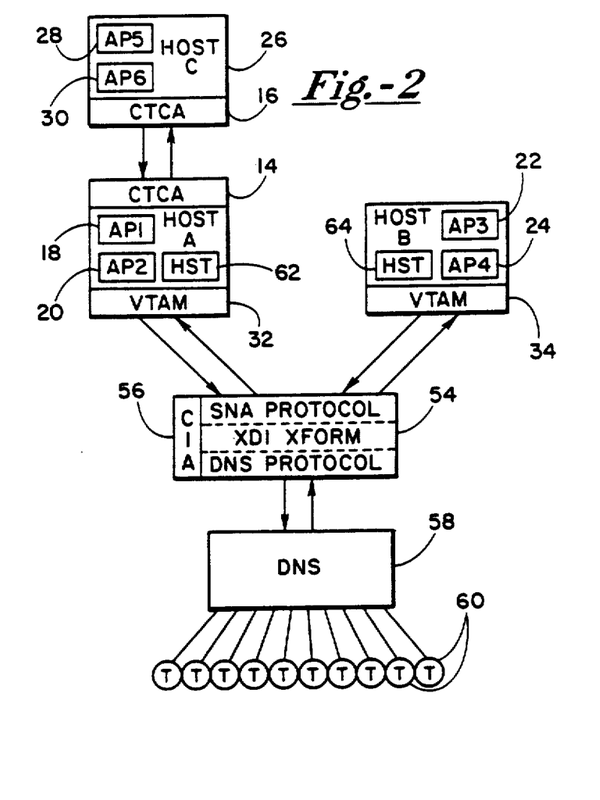
FIG. 2 is a block diagram of a data communications network in accordance with the presently preferred embodiment of the present invention.

FIG. 2 illustrates a block diagram of an improved data communication network employing the same host computers A, B, and C containing the respective application software 18, 20, 22, 24, 28, and 30 as heretofore described. VTAMs 32 and 34, instead of being connected to separate network controllers as in FIG. 1, are connected to separate ports of extended device interface (XDI) 54. Extended device interface provides interface to the host computers and includes a computer interface adapter (CIA) 56 for controlling data transfer, protocol, and message contention. Interface 54 performs the function of several separate processor means by (1) providing protocol of messages to and from each of the host computers A and B, (2) transformation of those messages to a form adaptable for the distributed network system (DNS) 58 and the languages of the host computers, and (3) message protocol and contention control for messages to and from the distributed network system 58. Thus, XDI 54 may be considered as a first processor providing protocol to the DNS 58, a second processor providing transformation functions, and a plurality of third processors providing protocol to each host computer A and B. Distributed network system 58 is a processor for processing messages between the host processors and the various terminals 60 connected to the system.

In operation of the apparatus illustrated in FIG. 2, each host computer contains a host support program (HSP) 62 or 64, respectively. This program contains a list or menu of the application programs active in the respective host computer. Information from the HSP is provided to the interface 54, so that terminals 60 seeking access to an application program will be routed by the interface 54 to the appropriate host computer. (As will be more fully understood, particularly in connection with FIG. 3, busses interconnecting a plurality of interfaces 54 and/or distributed network systems 58 will be able to route communications through the appropriate interface to access the correct host computer.)

Data messages from terminals 60 are processed by the distributed network system 58 to interface 54. The DNS protocol and CIA within interface 54 establish the data transfer and protocol of messages and resolves contention between several messages arriving simultaneously, and processes that data in parallel to the control and transform function of the interface. In the transformation of the data, the data is transformed to be compatible to the format of the host computer. Thereupon it is constituted into protocol for the host computer by the SNA protocol and thereupon transferred through the VTAM to the applicable host computer.

One feature of the present invention can be gleaned at this point in that the various host computers do not need to be compatible with one another. Instead, the interface transform at interface 54 will transform messages destined for a host computer to be compatible with that host computer and, conversely, transform messages from a host computer to be compatible with the distributed network system. As a result, incompatible host computers may be used together, each one operating in its own environment, transmitting and receiving data messages in a compatible format. Furthermore, because the data transfer is accomplished in parallel, rather than in series, transfer is quicker and more efficient, resulting in an overall increase in message transfer.

Figure 3:
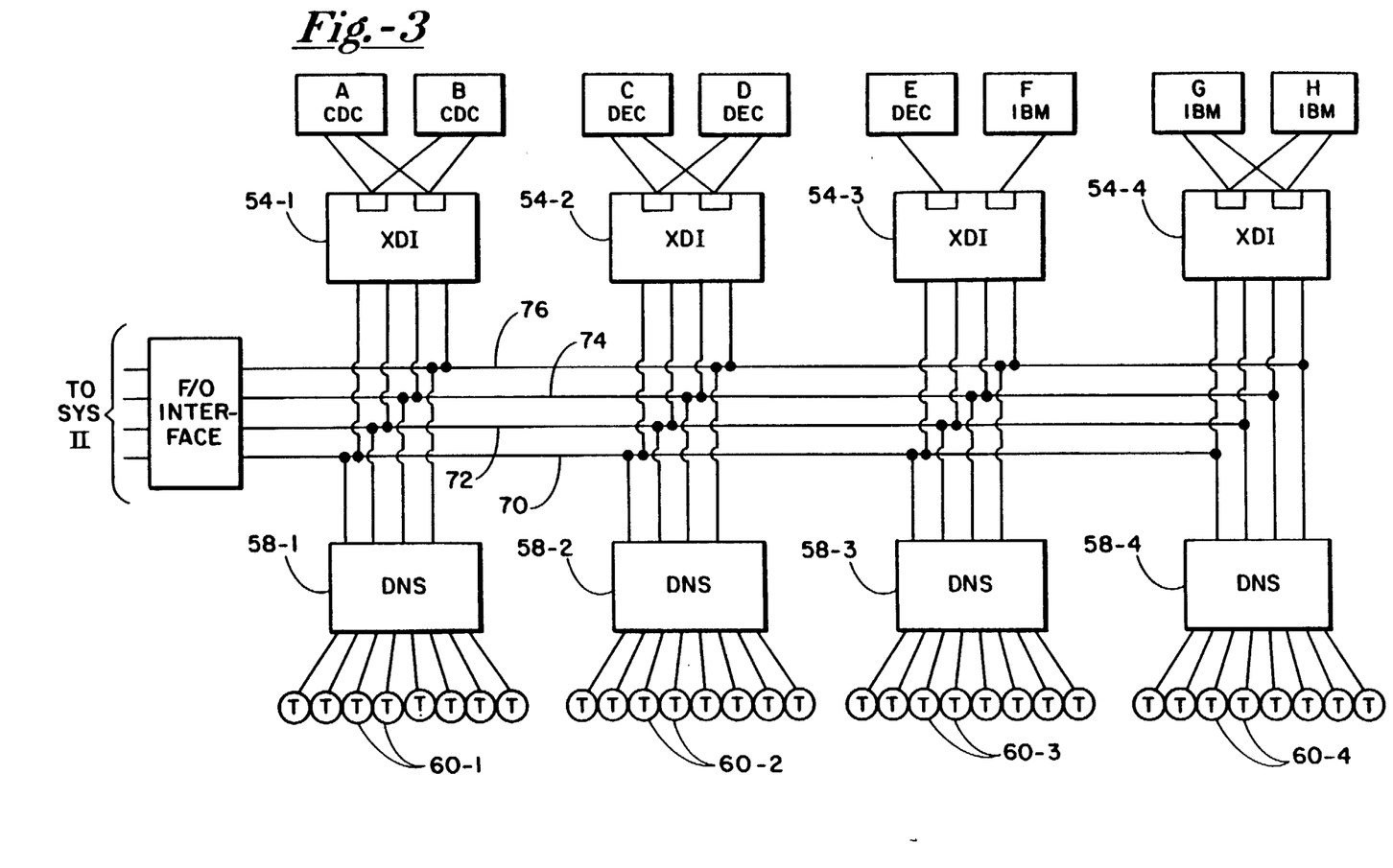
FIG. 3 is a block diagram of a data communication network, as in FIG. 2, employing a plurality of communications processors and busses for data communications.

FIG. 3 illustrates a system employing a bus for large-scale data communications. A plurality of host mainframes designated A, B, C, D, E, F, G, and H are connected in pairs to XDI interfaces 54-1, 54-2, 54-3, and 54-4. Each interface 54 has two ports and is adapted to support two host mainframes. Although four XDI interfaces are shown in FIG. 3, the number of such devices will depend on the size of the XDI-CIA address Mainframes A and B are connected to interface 54-1, mainframes C and D are connected to interface 54-2, and so on. In the example, it is assumed that mainframes A and B are of the same manufacture (CDC), mainframes C and D are of the same manufacture (DEC), and mainframes G and H are of the same manufacture (IBM). The compatible mainframes may be connected together by connecting each to both ports of interface 54. However, in the case of interface 54-3, mainframe E is of different manufacture (DEC) than mainframe F (IBM). Incompatible mainframes may be connected to the interface 54-3, but not to both ports.

Each of the interfaces 54 is connected to four separate buses 70, 72, 74, and 76 which are each connected to one distributed network system 58-1, 58-2, 58-3, and 58-4. Terminals 60-1 are connected to network 58-1, terminals 60-2 are connected to network 58-2, and so on.

In FIG. 3, like the apparatus illustrated in FIG. 2, full control over distribution of over data messages is handled by the distributed network systems 58 and interfaces 54. The processors (FIG. 5) within networks 58 will establish the protocol of messages to the interfaces 54. However, availability of applications with a given host processor is transmitted by the host processor HSP 62 or 64 (FIG. 2) to the associated interface 54. The interface advises each of the networks 58 of the availability of the application software so that if a terminal (any terminal) requires use of a given application software, access is made through the network 58, applicable bus 70-76 to the applicable interface 54 to access the appropriate host. For example, if host computer B contains a desired application for a terminal 60-3 connected to network 58-3, interface 54-1 contains information of the availability of the application and notifies all networks 58, including network 58-3 through busses 70 through 76. Hence, communication is established from terminal 60-3 through network 58-3, bus 74, interface 54-1 to the processor B. Control of the terminal-to-application session is maintained by XDI 54-1; the computers therefore see the interfaces 54 as terminals, not as crucial communication hardware.

One feature of the present invention resides in the fact that in the event of malfunction of any element of the system, such as a network 58 or an interface 54 or a mainframe, application software may be transferred between host computers through the applicable network control processor 52 (FIG. 2) and messages may be rerouted as controlled by the processor of the applicable network 58 through an alternate bus, interface, and mainframe. Additionally, the networks 58 may be linked together with a front-end bus thereby tying all the terminals together and to the networks 58 for parallel processing and backup redundancy in the event of error.

Figure 4A:
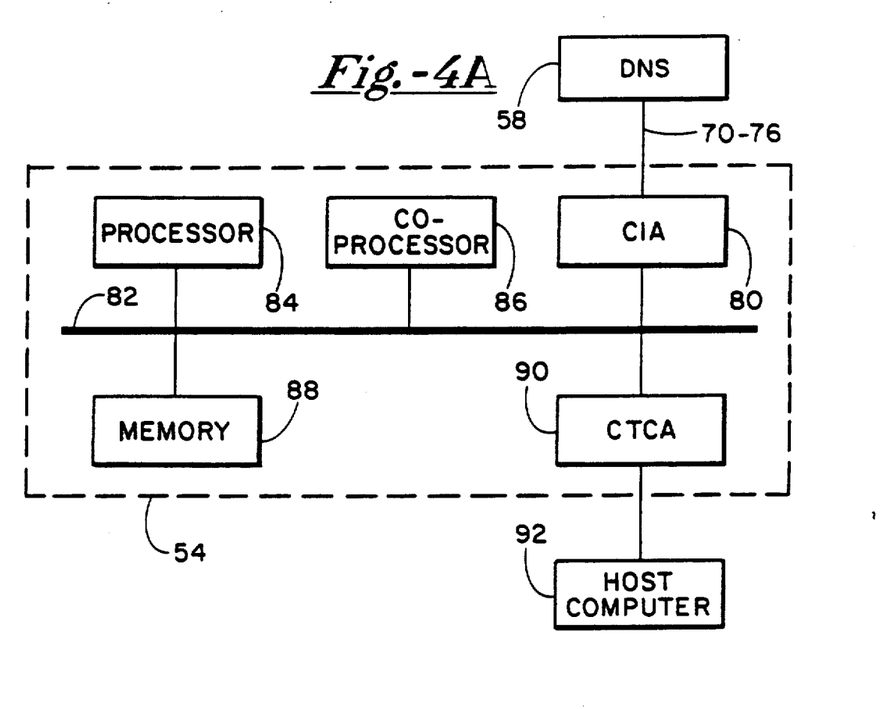
FIG. 4A is a block circuit diagram of an interface useful in the apparatus illustrated in FIGS. 2 and 3.
Figure 4B:
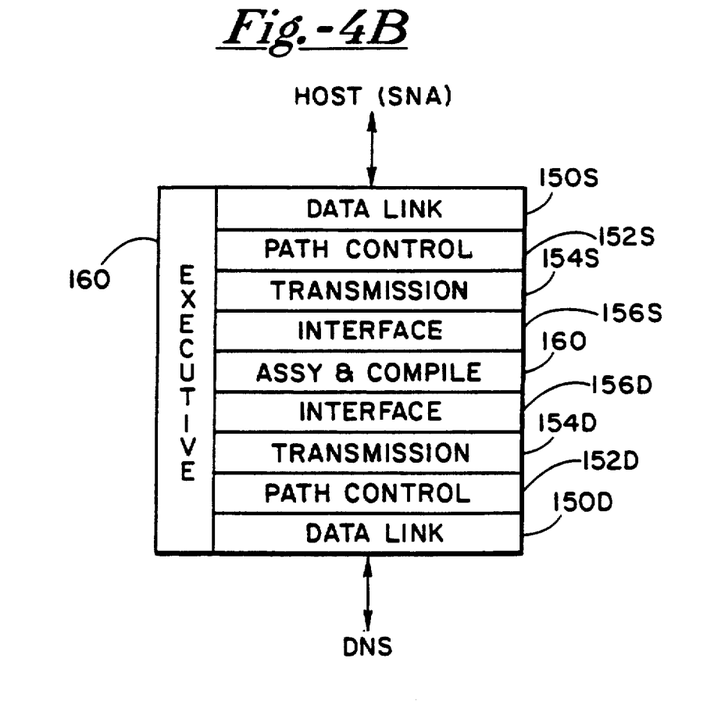
FIG. 4B is a diagram illustrating the processes performed by the interface.

Referring to FIG. 4A, the XDI 54 includes a CIA processor 80 connected to buses 70-76 for connection to the DNSs 58. FIG. 4A illustrates only one such bus 70-76 for sake of simplicity in explanation. The CIA 80 is connected to an internal XDI bus 82, which in turn is connected to a processor 84, co-processor 86 and memory 88. Processors 84 and 86 are parallel processors for handling and exchanging data link control, path control, transmission control, interface control, assembly and compiling functions for both DNS and SNA formats, all under the control of an executive program. XDI 54 also includes an interface 90, similar to a CTCA (FIG. 1) for protocol interface to a host computer 92 FIG. 4B diagrammatically illustrates the hierarchy of software process and control within XDI 54 to process DNS- and SNA-format messages. In its basic form as programmed, XDI 54 has, at its SNA and DNS diagrammatic bounds, a data link control 150S, 150D ("S" designating the SNA or host side, whereas "D" designates the DNS side), a path control 152S, 152D, transmission control 154S, 154D, interface control 156S, 156D and an assembly and compiler program 158 (at the core). All of the software and routines operate under the control of an executive program 160.

In operation of XDI 54, a message entering one side is processed as necessary and processed outward to the appropriate unit. For example, a terminal message from a DNS 58 is received and processed by data link control 150D. If control software 150D determines the message is for another terminal and requires no further processing, XDI 54 may return the message to the appropriate terminal through the data link control software 150D. On the other hand, if the message requires use of the DNS path control software 152D, an exchange is performed in the XDI to perform path control functions on the message. If the message is intended for transmission to a host computer on the SNA side, the message is exchanged from level to level diagrammatically shown in FIG. 4B, to transform the DNS-format message to an SNA-format message and to route it (by the transmission control software 154S, path control software 152S' and data link control software 150S) to the appropriate host computer 92. Memory 88 contains a menu of application software available in the associated host processors, so messages for access to particular software are routed to the correct host processor.

Figure 5:
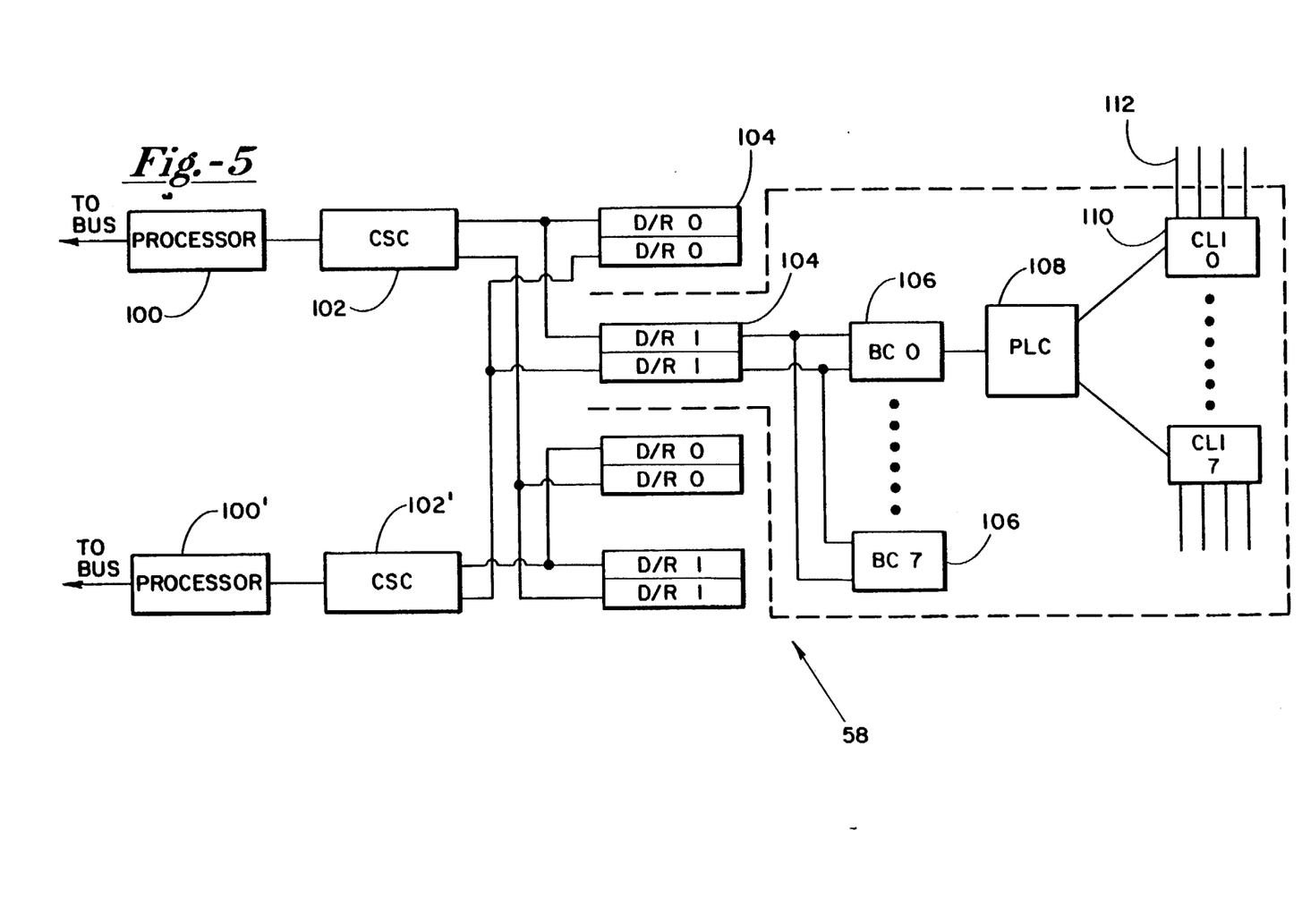
FIG. 5 is a block diagram of a communications processor useful in the apparatus illustrated in FIGS. 2 and 3.

FIG. 5 illustrates a portion of a DNS communications processor 58 in accordance with the presently and preferred embodiment of the present invention.

In the preferred embodiment, each communications processor 58 includes processor 100 connected to the buses 70, 72, 74, or 76 (FIG. 3) and to a communication subsystem controller 102. Controller 102 is connected to a pair of driver/receiver buses, each bus being connected primarily to two driver receivers 104. A redundant processor 100' and controller 102' provide backup for the main processor. Each driver/receiver 104 operates through eight buffer controllers 106, each of which operates through a programmable line controller 108 to operate eight communication line interfaces 110. Each interface 110 is capable of handling data four lines 112 of thirty-two terminals per line. Thus, each processor 100 acts as the primary communication channel for up to two hundred fifty-six lines and up to eight thousand one hundred ninety two terminal devices 60 (FIG. 3). Referring to FIG. 3, by utilizing the busses 70-76, the bus network can be replicated to handle additional groups of over 32,000 terminals and eight hosts. By increasing the CIA address of the XDIs, and employing a fiberoptic interface 78, up to sixteen hosts and eight DNSs can accommodate over 95,000 terminals.

The present invention thus provides a data communication network capable of communicating in parallel binary coded data between any of a plurality of host computers and any of a plurality of terminals. By processing the data in parallel, greater speeds than heretofore achieved in prior communications channels are achievable, resulting in more rapid communication and effective use of the host computers.

This invention is not to be limited by the embodiment shown in the drawings and described in the description, which is given in way of example and not of limitation, but only in accordance with the scope of the appended claims.

What is claimed is:

1. In a data communications system including a first host group of at least one first host computer operating on bit-encoded data according to a first format; a second host group including at least one second host computer operating on bit-encoded data according to a second format incompatible with the first format; a plurality of user terminals; an interface means connected to the first and second host groups, said interface means including data transforming means and protocol establishing means, and further including an interface memory means, said interface memory means containing application program information identifying application programs available in the individual ones of the host processors; a communications processor means connected to the terminals, operating on bit-encoded data according to a third format and including a transmission path selection means; and a plurality of data busses connecting the interface means and the communications processors means to provide a plurality of data transmission paths; a method of transmitting data messages between the host groups and the terminals, including the steps of:

a. utilizing the communications processor means to assign data messages to the host processors, based upon the application program information from said interface means;
 b. transmitting data messages in the first format between the first host group and the interface means;
 c. transmitting data messages in the second format between the second host group and the interface means;
 d. upon receiving data messages from the first and second host groups at the interface means, establishing protocol among the data messages and transforming the data messages from the respective first and second formats into the third format for subsequent transmission between the interface means and the data busses;
 e. transmitting data messages in the third format between the interface means and the communications processor means via the busses, and further transmitting data messages between the communications processor means and the terminals; and
 f. upon receiving data messages from the busses at the interface means, establishing protocol among the data messages and transforming the data messages from the third format into one of the first and second formats, the format to which each data message is transformed corresponding to the one of said first and second host groups to which the message is to be sent.

2. The method of claim 1 further including the step of:
 utilizing said path selection means to select an alternative one of said data transmission paths to avoid a malfunction, responsive to sensing the malfunction.

3. The method of claim 1 wherein:
 said communication processor means include a plurality of communications processors connected to respective pluralities of said terminals, and the interface means comprises a plurality of interfaces associated with groups of the host computers including a first interface associated with the first host group and a second interface associated with the second host group, each of the interfaces including data transforming means and protocol establishing means, and wherein each of the communications processors includes a control means, with the respective control means of the communications processors cooperating to provide said selection means; and
 wherein one of said respective control means, responsive to the determination of a malfunction, is utilized to select an alternative one of said data transmission paths for data messages to avoid the malfunction, the alternative one of the paths including at least an alternative one of the host processors, the interfaces or the busses.

4. The method of claim 3 wherein:
 each interface includes a respective interface memory containing information identifying application programs to be executed by the host processors in its associated group of the host processors, said respective interface memories cooperating to provide said interface memory means, said step of utilizing the communications processor means comprising utilizing the communications processors to assign data messages to the host processors, one of the communications processors assigning each data message to an individual one of the hose processors.

5. A data communications apparatus for transferring bit-encoded messages between a plurality of host processors and a plurality of user terminals, said host processors containing application routines and including at least one first host processor operating on data according to a first format and at least one second host processor operating on data according to a second format incompatible with the first format, said apparatus comprising:
 a first device interface connected to said at least one first host processor; a second device interface means connected to said at least one second host processor; a plurality of communications processors, operating on data according to a third format, each of the communications processors being connected to at least one of said terminals; and a data bus means connecting said first and second device interfaces to the communications processors;
 said first device interface including a first protocol establishing means connected to the communications processors through the bus means, a first-processing means connected to the first protocol establishing means, and a second protocol establishing means connected to the at least one first host processor and to the first processing means, said first protocol establishing means establishing protocol among messages transmitted between the first processing means and the communications processors, said second protocol establishing means establishing protocol among messages transmitted between the first processing means and said at least one first host processor; said first processing means further transforming each of the messages sent between the first protocol establishing means and the second protocol establishing means, from the one of said first and third formats suitable to the sending processing means, to the other of said first and third formats; wherein said second device interface means includes a third protocol establishing means connected to the communications processors through said bus means, a second processing means connected to the third protocol establishing means, and a fourth protocol establishing means connected to said at least one second host processor and to said second processing means, the third protocol establishing means establishing protocol among messages transmitted between the second processing means and the communications processors, said fourth protocol establishing means establishing protocol among messages transmitted between the second processing means and said at least one second host processor; wherein said second processing means transforms messages sent between said third protocol establishing means and said fourth protocol establishing means from the one of said second and third formats suitable to the sending processors to the other one of said second and third formats; and wherein said first and second device interfaces further include respective first and second memory means containing information of the application routines available in the respective associated one of said first and second host processors, and initially assign messages from said communications processors to the associated host processors on the basis of required application routines.

6. An apparatus for transmitting binary messages between a plurality of host processors and a plurality of user terminals, said host processors being arranged in a plurality of groups including a first group of host processors operating on data according to a first format and a second group of host processors operating on data according to a second format incompatible with the first format, each group of host processors comprising at least two host processors, each host processor containing application programs, said user terminals being arranged in a plurality of groups, each group of user terminals comprising at least two user terminals; said apparatus comprising:

a plurality of device interface means including a first interface connected to all host processors of the first host group, and a second device interface connected to all host processors of the second host group;

a plurality of communications busses, each of the busses being connected to all of the plurality of device interfaces;

a plurality of communications processors operating on data according to a third format, each communications processor being connected to all of the plurality of busses and being connected to all user terminals of one of the groups of terminals;

each of said device interfaces comprising: a first transforming means connected to the host processors of the respective one of said first and second host groups, for transforming binary messages from the associated one of said first and second formats to said third format; a second transforming means connected to each of the plurality of busses for transforming binary messages from the third format to the associated one of said first and second formats; a first data link means connected to each of the busses and to the first transforming means for transmitting transforming binary messages from an associated host processor to one of the busses connected to the communications processor for which the binary message is transformed; a second data link means connected to the host processors of the associated host group and to the second transforming means for transmitting transformed binary messages from one of the communications processors to the one of the host processors for which the binary message is transformed; protocol means for simultaneously establishing the protocol of processing of untransformed binary messages from each of the busses and transformed binary messages for each of the busses, and protocol of untransformed binary messages from each of the host processors and transformed binary messages for each of the host processors; and a memory means connected to said second transforming means and containing a menu of application programs in each host processor of the respective host processor group;

wherein said device interfaces, responsive to untransformed binary messages from each of the busses seeking access to an application program, control the respective transforming means to transform each untransformed message to a selected one of the first and second formats, corresponding to a selected host processor containing the application program; and wherein each of the communications processors includes a control means for selecting an alternative route for binary messages between said host processors and said terminals, responsive to the identification of a malfunction in one of said host processors or in one of said interfaces.

* * * * *

UNITED STATES PATENT AND TRADEMARK OFFICE
CERTIFICATE OF CORRECTION

PATENT NO. : 4,999,771

DATED : March 12, 1991

INVENTOR(S) : Ralph et al

It is certified that error appears in the above-identified patent and that said Letters Patent is hereby corrected as shown below:

Column 7, Line 22, "processors" should read -- processor --.

Column 7, Line 61, "communication" should read -- communications --.

Column 8, Line 25, "hose" should read -- host --.

Column 10, Line 14, "transforming" should read -- transformed --.

Signed and Sealed this

Seventeenth Day of November, 1992

Attest:

DOUGLAS B. COMER

Attesting Officer

Acting Commissioner of Patents and Trademarks